(12) United States Patent
Cai et al.

(10) Patent No.: US 10,386,588 B1
(45) Date of Patent: Aug. 20, 2019

(54) OPTICAL FIBER CONNECTOR

(71) Applicant: Dongguan Lan Guang Plastic Moulding Co., Ltd., Dongguan (CN)

(72) Inventors: Xinde Cai, You County (CN); Jianbo Lan, Luzhou (CN); Dawei Guo, Bao Kang County (CN); Zhongming Wu, Xu Pu County (CN); Haiping Wu, You County (CN)

(73) Assignee: DONGGUAN LAN GUANG PLASTIC MOULDING CO., LTD., Dongguan, Guangdong Province (CN)

( * ) Notice: Subject to any disclaimer, the term of this patent is extended or adjusted under 35 U.S.C. 154(b) by 0 days.

(21) Appl. No.: 16/109,876

(22) Filed: Aug. 23, 2018

(30) Foreign Application Priority Data

Jun. 27, 2018 (CN) .......................... 2018 1 06764515

(51) Int. Cl.
*G02B 6/42* (2006.01)

(52) U.S. Cl.
CPC ........... *G02B 6/4244* (2013.01); *G02B 6/428* (2013.01); *G02B 6/4214* (2013.01); *G02B 6/4239* (2013.01); *G02B 6/4292* (2013.01)

(58) Field of Classification Search
CPC .. G02B 6/4244; G02B 6/4214; G02B 6/4239; G02B 6/428; G02B 6/4292
USPC ......................................................... 385/89
See application file for complete search history.

(56) References Cited

U.S. PATENT DOCUMENTS

| | | | | |
|---|---|---|---|---|
| 5,758,950 A | * | 6/1998 | Naoe .................... | G02B 6/4204 362/259 |
| 6,271,049 B1 | * | 8/2001 | Auracher ............. | G02B 6/4214 438/22 |
| 2010/0118909 A1 | * | 5/2010 | Kuo ....................... | G02B 6/423 372/50.1 |
| 2015/0260929 A1 | * | 9/2015 | Matsumaru .......... | G02B 6/4214 385/52 |

* cited by examiner

*Primary Examiner* — Jerry M Blevins
(74) *Attorney, Agent, or Firm* — Dragon Sun Law Firm, PC; Jinggao Li, Esq.

(57) ABSTRACT

Disclosed is an optical fiber connector, including a connecting member, an optical component and an optical fiber. The connecting member is provided with an insertion hole, an optical fiber core of the optical fiber passes through the insertion hole; an end surface of the optical fiber core is flush with an end surface of the connecting member; the optical component is provided with an insertion slot; an end of the connecting member is inserted into the insertion slot; the optical component is provided with a first optical path opening and a second optical path opening; an end of the optical fiber core is aligned with the first optical path opening; a light guiding device for conducting a light beam is disposed between the first optical path opening and the second optical path opening; and a circuit board is disposed below the optical component.

9 Claims, 3 Drawing Sheets

1

OPTICAL FIBER CONNECTOR

CROSS-REFERENCE TO RELATED APPLICATION

This application claims priority from CN Application No. 2018106764515, filed Jun. 27, 2018, the contents of which are incorporated herein in the entirety by reference.

TECHNICAL FIELD

The present disclosure relates to the technical field of optical fiber apparatus, in particular to an optical fiber connector.

BACKGROUND

An optical fiber connector is a device that connects optical fibers to each other by precisely butting two end surfaces of the optical fibers, such that optical energy output from the transmitting optical fiber can be coupled to the receiving optical fiber to the maximum extent and the impact on the system caused by its interference with the optical link can be minimized, which is a basic requirement for an optical fiber connector. To some extent, the optical fiber connector affects the reliability and various performances of an optical transmission system.

With the rapid development of network requirements, fiber optic equipment has higher and higher requirements for a data communication rate, and also has increasingly higher requirements for the stability and reliability of the connector. An optical component of the existing optical fiber connector is usually glued at the bottom and bonded to a circuit board by glue, but this fixing method has a poor bonding effect and cannot ensure that the optical component is stably and reliably fixed to the circuit board. Moreover, in the existing optical fiber connector, an optical component and connecting member thereof are made of different materials, so that due to the influence of cold and heat factors, the optical component and the connecting member are deformed to different degrees, in a long term resulting in failure to reliably connect the optical component to the connecting member, which in turn affects the accuracy of optical signal transmission. To avoid the impact of deformation, the optical component and the connecting member could be manufactured in larger and thicker size; however, this may lead to a problem that the overall size of the optical fiber connector is too large to meet application requirements and future development needs.

Therefore, a heretofore unaddressed need exists in the art to address the aforementioned deficiencies and inadequacies.

SUMMARY OF THE DISCLOSURE

In view of the shortcomings in the prior art, the technical problem to be solved by the present disclosure is to provide an optical fiber connector which can ensure that an optical component is reliably bonded and fixed to a circuit board, thereby improving the structural stability and overall performance of products.

In order to solve the above-mentioned technical problem, the present disclosure adopts the following technical solutions.

An optical fiber connector comprises: a connecting member, an optical component and an optical fiber, wherein the connecting member is provided with an insertion hole, an optical fiber core of the optical fiber passes through the insertion hole, an end surface of the optical fiber core is flush with an end surface of the connecting member, the optical component is provided with an insertion slot, an end of the connecting member is inserted into the insertion slot, the connecting member is fixedly connected to the optical component, the optical component is provided with a first optical path opening and a second optical path opening, an end of the optical fiber core is aligned with the first optical path opening, a light guiding device for conducting a light beam is disposed between the first optical path opening and the second optical path opening, the bottom of the optical component is formed with an outwardly extending flange, the flange is provided with a plurality of notches, a circuit board is disposed below the optical component, the bottom of the optical component is attached to the circuit board, the flange is bonded to the circuit board at the joint by glue, and the glue is filled into the notches.

Preferably, the flange extends in a circumferential direction of the optical component.

Preferably, the connecting member is a T-shaped connecting member comprising two shoulders, two side plates are formed on the optical component, the insertion slot is formed between the two side plates, narrow slots are formed between ends of the side plates and the shoulders, and the narrow slots are filled with glue.

Preferably, an inner side of the side plate is provided with an inclined surface that inclines outwardly, the inclined surface extends from the inner side to the end of the side plate, a V-shaped groove is formed between the inclined surface and the connecting member, and the V-shaped groove is in communication with the narrow slot so that glue is filled into the V-shaped groove via the narrow slot.

Preferably, two positioning posts are formed on the optical component, the positioning posts are disposed in the insertion slot, the connecting member is provided with two positioning holes, the positioning holes penetrate through two ends of the connecting member, the positioning holes and the positioning posts are in one-to-one alignment, and the positioning posts are inserted into the positioning holes.

Preferably, the optical fiber is a ribbon optical fiber comprising a plurality of optical fiber cores, the connecting member is provided with a plurality of insertion holes, and the optical fiber cores and the insertion holes are in one-to-one alignment.

Preferably, the connecting member is provided with a rabbet for accommodating the optical fiber, a slope is formed between an end of the insertion hole and the bottom of the rabbet, and the slope is provided with a clearance groove corresponding to the optical fiber core.

Preferably, an exposed portion with a predetermined length is formed at the root of the optical fiber core, and the exposed portion is located between the end of the insertion hole and a sheath of the optical fiber.

Preferably, a plurality of light guiding devices arranged side by side are provided in the optical component, the light guiding devices and the optical fiber cores are in one-to-one correspondence, the light guiding device comprises a reflector inclining at an angle of 45°, and a photoelectric element is provided in the second optical path opening.

Preferably, the connecting member and optical component are devices made of the same material.

In the optical fiber connector disclosed in the present disclosure, the flange and the circuit board form a stepped structure, and during glue filling, the glue can be either filled to cover the flange, or filled at the boundary between the flange and the circuit board, so that the flange and the circuit board are firmer after bonding. Particularly, the flange is provided with a plurality of notches, and under the action of the notches, it is possible to not only increase the bonding area of the glue on the flange, but also overcome a greater stress after bonding and fixing, thereby adapting to various environmental changes to avoid the influence on the performance of products due to the deformation of the connector, so as to effectively meet the application requirements and have a good market prospect.

DETAILED DESCRIPTION OF THE DISCLOSURE

The present disclosure will be described in more detail in conjunction with the accompanying drawings and embodiments.

Figure 1:
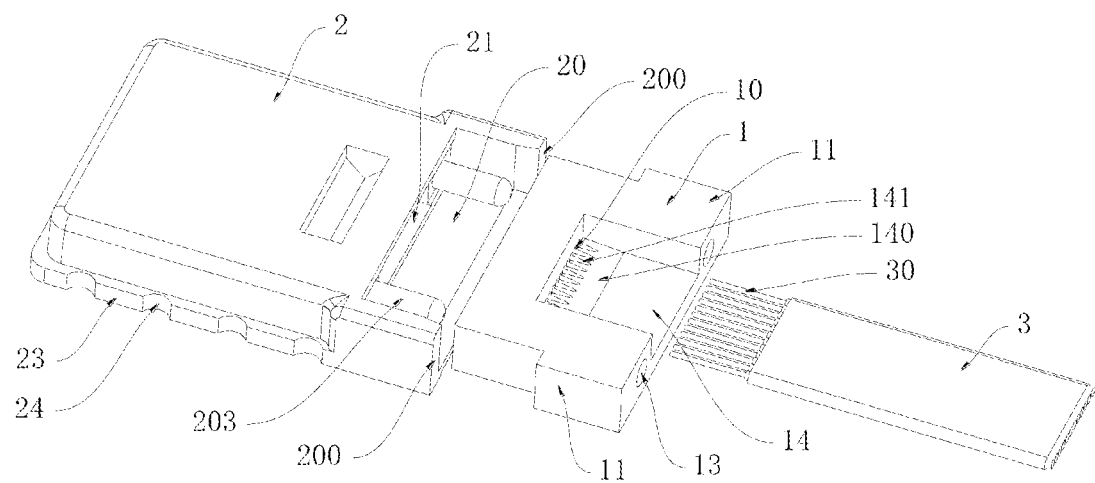
FIG. 1 is a structural diagram of an optical fiber connector of the present disclosure before assembly.
Figure 2:
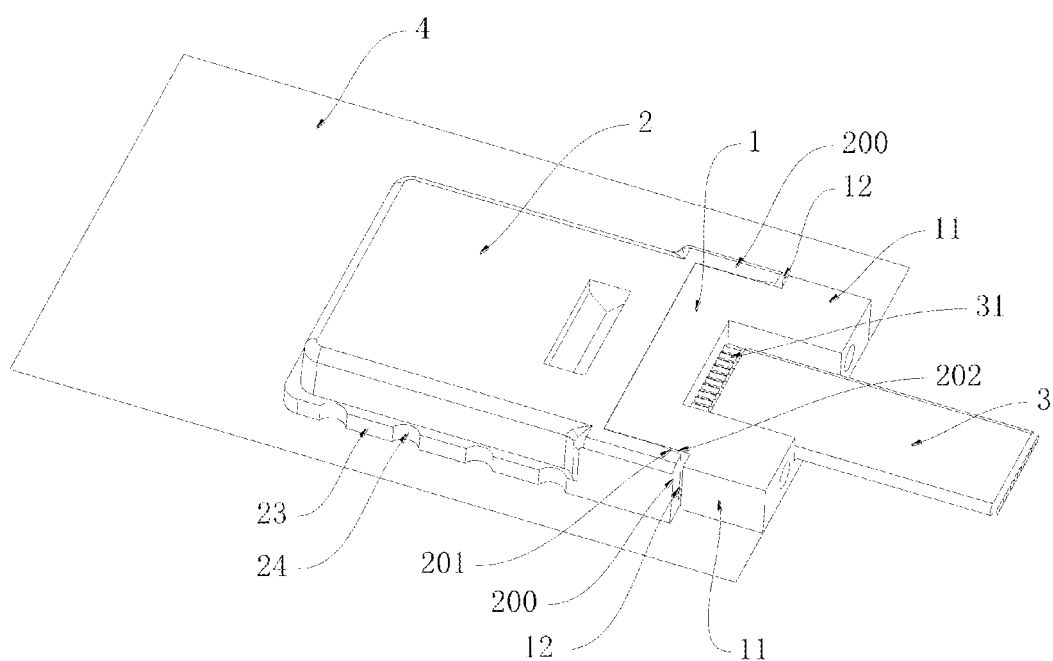
FIG. 2 is a structural diagram of an optical fiber connector of the present disclosure after assembly.
Figure 3:
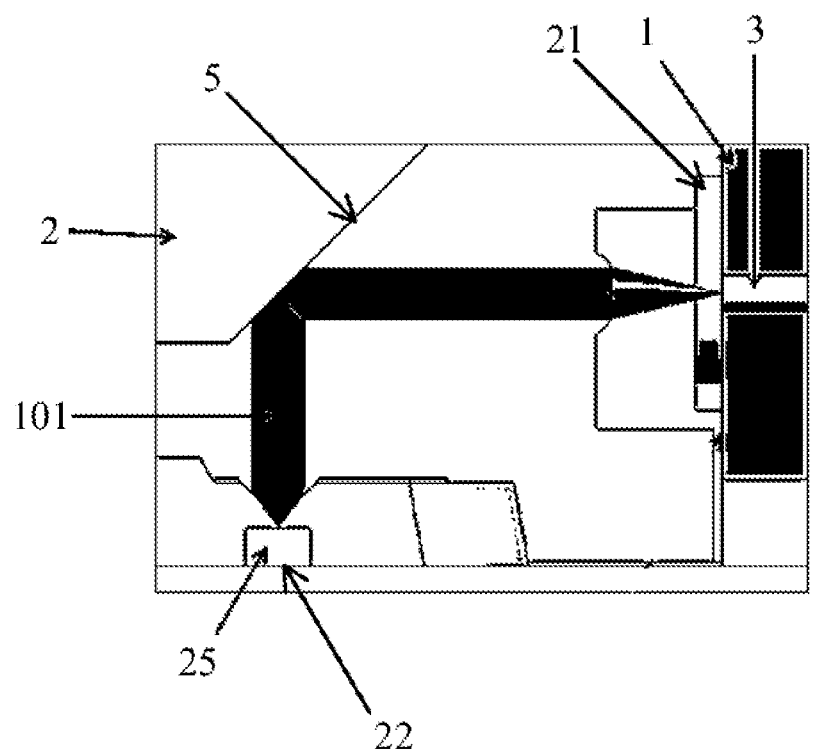
FIG. 3 is a schematic diagram of the internal structure of an optical component.

Disclosed is an optical fiber connector, as shown in FIGS. 1 to 3, comprising: a connecting member 1, an optical component 2 and an optical fiber 3, wherein the connecting member 1 is provided with an insertion hole 10, an optical fiber core 30 of the optical fiber 3 passes through the insertion hole 10, an end surface of the optical fiber core 30 is flush with an end surface of the connecting member 1, the optical component 2 is provided with an insertion slot 20, an end of the connecting member 1 is inserted into the insertion slot 20, the connecting member 1 is fixedly connected to the optical component 2, the optical component 2 is provided with a first optical path opening 21 and a second optical path opening 22, an end of the optical fiber core 30 is aligned with the first optical path opening 21, a light guiding device for conducting a light beam 101 is disposed between the first optical path opening 21 and the second optical path opening 22, the bottom of the optical component 2 is formed with an outwardly extending flange 23, the flange 23 is provided with a plurality of notches 24, a circuit board 4 is disposed below the optical component 2, the bottom of the optical component 2 is attached to the circuit board 4, the flange 23 is bonded to the circuit board 4 at the joint by glue, and the glue is filled into the notches 24.

In the optical fiber connector mentioned above, the flange 23 and the circuit board 4 form a stepped structure, and during glue filling, the glue can be either filled to cover the flange 23, or filled at the boundary between the flange 23 and the circuit board 4, so that the flange 23 and the circuit board 4 are firmer after bonding. Particularly, the flange 23 is provided with a plurality of notches 24, and under the action of the notches 24, it is possible to not only increase the bonding area of the glue on the flange 23, but also overcome a greater stress after bonding and fixing, thereby adapting to various environmental changes to avoid the influence on the performance of products due to the deformation of the connector, so as to effectively meet the application requirements and have a good market prospect.

In this embodiment, it is preferred to adopt a method of applying glue at the periphery, and specifically, the flange 23 extends in a circumferential direction of the optical component 2.

During processing, the end surface of the optical fiber core 30 can be processed by grinding or laser cutting.

In this embodiment, the optical component 2 is fixed to the circuit board, and after the coupling is completed, a UV glue is used for pre-fixing, then a thermosetting glue is applied to three side edges, and then the optical component is baked in a high temperature oven at a temperature of 90-120° for 0.5-2 hours.

In order to bond and fix the connecting member 1 to the optical component 2, in this embodiment, the connecting member 1 is a T-shaped connecting member comprising two shoulders 11, two side plates 200 are formed on the optical component 2, the insertion slot 20 is formed between the two side plates 200, narrow slots 12 are formed between ends of the side plates 200 and the shoulders 11, and the narrow slots 12 are filled with glue.

As a preferred embodiment, an inner side of the side plate 200 is provided with an inclined surface 201 that inclines outwardly, the inclined surface 201 extends from the inner side to the end of the side plate 200, a V-shaped groove 202 is formed between the inclined surface 201 and the connecting member 1, and the V-shaped groove 202 is in communication with the narrow slot 12 so that glue is filled into the V-shaped groove 202 via the narrow slot 12. Under the action of the V-shaped groove 202, the glue application area between the connecting member 1 and the optical component 2 is further enlarged, so that the connecting member 1 and the optical component 2 are bonded more tightly and stably.

In order to function for positioning during insertion, in this embodiment, two positioning posts 203 are formed on the optical component 2, the positioning posts 203 are disposed in the insertion slot 20, the connecting member 1 is provided with two positioning holes 13, the positioning holes 13 penetrate through two ends of the connecting member 1, the positioning holes 13 and the positioning posts 203 are in one-to-one alignment, and the positioning posts 203 are inserted into the positioning holes 13.

In this embodiment, the optical fiber 3 is a ribbon optical fiber comprising a plurality of optical fiber cores 30, the connecting member 1 is provided with a plurality of insertion holes 10, and the optical fiber cores 30 and the insertion holes 10 are in one-to-one alignment.

As a preferred embodiment, the connecting member 1 is provided with a rabbet 14 for accommodating the optical fiber 3, a slope 140 is formed between an end of the insertion hole 10 and the bottom of the rabbet 14, and the slope 140 is provided with a clearance groove 141 corresponding to the optical fiber core 30. Under the action of the slope 140, the optical fiber 3 can be pressed tightly in a better way, thereby improving the tightness after the insertion.

In order to conveniently observe the insertion state of the optical fiber core 30, in this embodiment, an exposed portion 31 with a predetermined length is formed at the root of the optical fiber core 30, and the exposed portion 31 is located between the end of the insertion hole 10 and a sheath of the optical fiber 3. Based on the above structure, the top of the connecting member 1 is in an open state, which facilitates visual inspection of the connector and effectively improves the production efficiency and yield of product. In comparison with the closed product structure in the current market, there is no need to rely on dedicated inspection equipment in this embodiment, thereby effectively reducing the production cost.

As a preferred embodiment, a plurality of light guiding devices arranged side by side are provided in the optical component 2, the light guiding devices and the optical fiber cores 30 are in one-to-one correspondence, the light guiding device comprises a reflector 5 inclining at an angle of 45°, and a photoelectric element 25 is provided in the second optical path opening 22.

Preferably, the spacing between the adjacent light guiding devices is set to be 250 μm, and the light guiding devices may be used at intervals, for example, the first light guiding device is in use, the second light guiding device is idle, the third light guiding device is in use, and the fourth light guiding device is idle, as such a combination of multiple modes can be achieved to greatly enhance the matching with the photoelectric element, which better overcomes the shortcoming of simple application mode at present.

In this embodiment, the connecting member 1 and the optical component 2 are devices made of the same material. Using the same material is advantageous in that, when a product is affected by the ambient temperature factor, since the connecting member 1 and the optical component 2 have the same deformation coefficient, the device can be protected against inconsistent expansion under the influence of the device itself and the ambient temperature during operation, thereby preventing power loss. In addition, based on the above features, there is no need to make the connecting member 1 and the optical component 2 too large or too thick in size, thereby meeting the application requirements and future development needs.

In a preferred embodiment of the present disclosure, the working principle of the optical fiber connector comprises:

at a transmitting end, light emitted by the photoelectric element is converged into parallel or parallel-like light via a first lens in the light guiding device, is totally reflected when it is propagated to a 45° reflector 5, is converged into a collimated light spot via a second lens, and is then incident on an end surface of an optical fiber core, the end surface of the optical fiber core being processed by grinding or laser cutting; and at a receiving end, light emitted by the optical fiber core is converged into parallel or parallel-like light via the second lens, is totally reflected when it is propagated to the 45° reflector 5, is converged into a collimated light spot via the first lens, and is then incident on a photoelectric induction face of a top face of the photoelectric element, so that current is excited and converted into an electrical signal.

The optical fiber connector disclosed in the present disclosure not only has a better bonding effect and more stable product structure, but also can meet the requirement of a small size. Moreover, the optical fiber connector is easy to assemble and inspect, can effectively improve the production efficiency, and can be widely applied to photoelectric emission devices of 40 G, 100 G and HDMI type products, thereby achieving high-speed data transmission.

The above description is merely a preferred embodiment of the present disclosure and is not intended to limit the present disclosure, and the modifications, equivalent alternatives, improvements, etc. made within the technical scope of the present disclosure are all intended to be included within the scope of the present disclosure.

What is claimed is:

1. An optical fiber connector, comprising:
   a connecting member;
   an optical component and an optical fiber, wherein the connecting member is provided with an insertion hole;
   an optical fiber core of the optical fiber passes through the insertion hole;
   an end surface of the optical fiber core is flush with an end surface of the connecting member;
   the optical component is provided with an insertion slot;
   an end of the connecting member is inserted into the insertion slot;
   the connecting member is fixedly connected to the optical component;
   the optical component is provided with a first optical path opening and a second optical path opening;
   an end of the optical fiber core is aligned with the first optical path opening;
   a light guiding device for conducting a light beam is disposed between the first optical path opening and the second optical path opening;
   the bottom of the optical component is formed with an outwardly extending flange;
   the flange is provided with a plurality of notches;
   a circuit board is disposed below the optical component;
   the bottom of the optical component is attached to the circuit board;
   the flange is bonded to the circuit board at the joint by glue;
   the glue is filled into the notches;
   the connecting member is a T-shaped connecting member comprising two shoulders;
   two side plates are formed on the optical component;
   the insertion slot is formed between the two side plates;
   slots are formed between ends of the side plates and the shoulders; and
   the slots are filled with glue.

2. The optical fiber connector of claim 1, wherein the flange extends in a circumferential direction of the optical component.

3. The optical fiber connector of claim 1, wherein an inner side of the side plate is provided with an inclined surface that inclines outwardly;
   the inclined surface extends from the inner side to the end of the side plate;
   a V-shaped groove is formed between the inclined surface and the connecting member; and
   the V-shaped groove is in communication with the narrow slot so that glue is filled into the V-shaped groove via the narrow slot.

4. The optical fiber connector of claim 1, wherein two positioning posts are formed on the optical component;
   the positioning posts are disposed in the insertion slot;
   the connecting member is provided with two positioning holes;
   the positioning holes penetrate through two ends of the connecting member;
   the positioning holes and the positioning posts are in one-to-one alignment; and
   the positioning posts are inserted into the positioning holes.

5. The optical fiber connector of claim 1, wherein the optical fiber is a ribbon optical fiber comprising a plurality of optical fiber cores;
   the connecting member is provided with a plurality of insertion holes; and
   the optical fiber cores and the insertion holes are in one-to-one alignment.

6. The optical fiber connector of claim 5, wherein the connecting member is provided with a rabbet for accommodating the optical fiber;
   a slope is formed between an end of the insertion hole and the bottom of the rabbet; and
   the slope is provided with a clearance groove corresponding to the optical fiber core.

7. The optical fiber connector of claim 5, wherein a plurality of light guiding devices arranged side by side are provided in the optical component;
the light guiding devices and the optical fiber cores are in one-to-one correspondence;
the light guiding device comprises a reflector inclining at an angle of 45°; and
a photoelectric element is provided in the second optical path opening.

8. The optical fiber connector of claim 1, wherein the connecting member and optical component are devices made of the same material.

9. An optical fiber connector, comprising:
a connecting member;
an optical component and an optical fiber, wherein the connecting member is provided with an insertion hole;
an optical fiber core of the optical fiber passes through the insertion hole;
an end surface of the optical fiber core is flush with an end surface of the connecting member;
the optical component is provided with an insertion slot;
an end of the connecting member is inserted into the insertion slot;
the connecting member is fixedly connected to the optical component;
the optical component is provided with a first optical path opening and a second optical path opening;
an end of the optical fiber core is aligned with the first optical path opening;
a light guiding device for conducting a light beam is disposed between the first optical path opening and the second optical path opening;
the bottom of the optical component is formed with an outwardly extending flange;
the flange is provided with a plurality of notches;
a circuit board is disposed below the optical component;
the bottom of the optical component is attached to the circuit board;
the flange is bonded to the circuit board at the joint by glue;
the glue is filled into the notches;
an exposed portion with a predetermined length is formed at the root of the optical fiber core;
the exposed portion is located between the end of the insertion hole and a sheath of the optical fiber;
the optical fiber is a ribbon optical fiber comprising a plurality of optical fiber cores;
the connecting member is provided with a plurality of insertion holes;
the optical fiber cores and the insertion holes are in one-to-one alignment;
the connecting member is provided with a rabbet for accommodating the optical fiber;
a slope is formed between an end of the insertion hole and the bottom of the rabbet; and
the slope is provided with a clearance groove corresponding to the optical fiber core.

* * * * *